United States Patent

Kawai et al.

[11] Patent Number: 6,093,762
[45] Date of Patent: Jul. 25, 2000

[54] BINDER RESIN FOR LITHOGRAPHIC PRINTING INK VEHICLE AND METHOD FOR PRODUCING THE SAME

[75] Inventors: Kazuo Kawai; Takaaki Takeshita, both of Yokohama; Hironobu Soeda, Kawasaki, all of Japan

[73] Assignee: Nippon Petrochemicals Company Limited, Tokyo, Japan

[21] Appl. No.: 09/071,883

[22] Filed: May 5, 1998

[30] Foreign Application Priority Data

May 7, 1997 [JP] Japan .................................. 9-134283

[51] Int. Cl.[7] .......................... C09D 11/10; C09D 145/00; C09D 161/06
[52] U.S. Cl. ........................... 524/313; 524/490; 525/139; 106/31.86; 106/31.88
[58] Field of Search ............................. 525/139; 524/313, 524/490; 106/31.86, 31.88

[56] References Cited

U.S. PATENT DOCUMENTS

| 4,385,149 | 5/1983 | Tsuchiya . |
| 4,552,923 | 11/1985 | Tsuchiya . |
| 5,225,477 | 7/1993 | Sasaki . |

FOREIGN PATENT DOCUMENTS

| 0 407 201 A1 | 1/1991 | European Pat. Off. . |
| 0697 446 A1 | 2/1996 | European Pat. Off. . |
| 697446 | 2/1996 | European Pat. Off. . |

*Primary Examiner*—David Buttner
*Attorney, Agent, or Firm*—Hollander Law Firm, P.L.C.

[57] ABSTRACT

A vehicle for lithographic printing ink is prepared by using an improved binder resin of petroleum resin-modified phenol resin, in which the melt viscosity of the binder resin is maintained below a certain level to improve the workability in polymerization process and the misting in printing press is reduced by using the improved binder resin. In the preparation of the binder resin, acid modified hydrocarbon resin (A) is prepared by reacting components (a) mainly comprising five-membered cyclic compounds or their Diels-Alder reaction products with the components (b) comprising unsaturated carboxylic acids or their anhydrides, and said acid modified hydrocarbon resin (A) is then reacted with phenol resin (B) in which portions of the phenol resin are fed one after another, thereby producing said binder resin having the properties of: high weight average molecular weight, low melt viscosity and low ratio of melt viscosity to solution viscosity.

15 Claims, No Drawings

BINDER RESIN FOR LITHOGRAPHIC PRINTING INK VEHICLE AND METHOD FOR PRODUCING THE SAME

BACKGROUND OF THE INVENTION (1) Field of the Invention

This invention relates to printing ink used for lithographic (planographic) printing as well as offset printing. More particularly, the invention relates to a vehicle of lithographic printing ink, a binder resin used for preparing the ink vehicle and a method for producing the binder resin. In the present invention, the molecular weight of the binder resin is made so high that the misting is reduced and the workability in polymerization process for the binder resin is improved by maintaining the melt viscosity of the binder resin below a certain level.

(2) Prior Art

The lithographic printing inks in the prior art, especially those used for sheet-fed printing and for heat-set printing, are generally prepared by adding suitable pigments to a composition of a binder resin typically exemplified by rosin-modified phenol resin, petroleum resin or alkyd resin; drying oil or semi-drying oil such as linseed oil, tung oil or safflower oil; and a vehicle mainly comprising a high boiling petroleum solvent, and they are kneaded using a mixing apparatus such as a three-roll ink mill. Among the above-mentioned petroleum solvents, the aromatic petroleum solvents are hitherto employed widely because they are excellent in solvent power to the binder resin, in addition, they are inexpensive.

In recent years, as the environmental protection is attracting considerable attention in the industry, it is investigated to replace the aromatic solvents formerly used for preparing printing inks with non-aromatic solvents, especially, naphthenic solvents which are desirable in view of the problems in environmental protection in printing job sites. The non-aromatic solvents are, however, inferior to the conventionally used aromatic solvents in the solvent power to binder resins, so that it is difficult to impart the gloss to printed images by replacing only the aromatic solvents with non-aromatic solvents. As a countermeasure in this regard, it has been proposed to form oxidation polymerization layers on printed materials by increasing the content of drying oil in a printing ink. However, in the printing ink of this kind, some other problems are pointed out such as the lowering in drying property and heat-setting property.

For Example, in European Patent No. 697 446, it is proposed that modified petroleum resins having weight average molecular weights of 30,000 to 200,000 are prepared as binder resins by reacting the maleic modified resin of the copolymer of dicyclopentadiene (DCPD) and α-olefin with phenol resin prepared from butyl phenol, and they are used for the vehicles of lithographic printing inks containing non-aromatic hydrocarbon resins.

In recent years, with the tendency to use high speed printing machines, the problem of misting became conspicuous. For example, in an offset rotary press, the problem of misting is serious because even a rotational speed as high as more than 1000 rpm is often adopted.

There is a tendency that the misting is reduced by using a resin of higher molecular weight. However, when the molecular weight of polymer is simply increased, it is apprehended that the melt viscosity of resin is raised, as a result, the workability in bulk polymerization is impaired. For example, in the case of the binder resin as disclosed in the foregoing European Patent No. 697 446, when its molecular weight is simply increased, the melt viscosity is also raised with the rise of the molecular weight, so that such a resin cannot be used because the workability in polymerization is impaired.

BRIEF SUMMARY OF THE INVENTION

It is, therefore, the object of the present invention to eliminate the above-described problems in the prior art.

A first object of the present invention is to provide a vehicle using a binder resin for lithographic printing ink, in which the melt viscosity of the resin is maintained below a certain level and the workability in polymerization is improved as well as the occurrence of misting due to the increase in molecular weight is reduced.

Another object of the present invention is to provide a vehicle using a novel highly polymerized binder resin for lithographic printing ink, which resin is excellent in the solubility to non-aromatic solvents, especially to naphthenic solvents.

Still a further object of the present invention is to provide a method for producing the above-mentioned novel binder resin.

The inventors of the present invention have found out that the melt viscosities of resins closely relate to the molecular structure of them and, therefore, the melt viscosities do not always correlate to their molecular weights. Accordingly, the present invention has been accomplished. In other words, the structure of resin is modified by polymerizing through a specific preparation method, as a result, the misting of printing ink could be made better, meanwhile the melt viscosity of binder resin could be maintained below a certain level.

Therefore, a first aspect of the present invention relates to a binder resin for use in the preparation of the vehicle for lithographic printing ink.

The binder resin is a petroleum resin-modified phenol resin comprising the following components (I):

(I) petroleum resin-modified phenol resin which is prepared by reacting:
acid modified hydrocarbon resin (A): . . . 100 parts by weight
and phenol resin (B) having alkyl substituent groups each having 4 to 25 carbon atoms: . . . 30–150 parts by weight,
said acid modified hydrocarbon resin (A) being prepared by reacting:

(a) compounds mainly comprising five-membered cyclic compounds represented by the following general formula [1] or their Diels-Alder reaction products: . . . 100 parts by weight and (b) unsaturated carboxylic acids or their anhydrides: . . . 1–20 parts by weight, and said petroleum resin-modified phenol resin (I) having the properties of:

<1> weight average molecular weight of not less than: . . . 200,000

<2> melt viscosity ($V_m$) of not higher than: . . . 100 Pa·s

<3> K value ($V_m/V_s$) as a ratio of melt viscosity to solution viscosity ($V_s$) of not higher than: . . . 0.2,

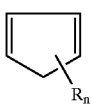

wherein R denotes a hydrogen atom or an alkyl group having 1 to 3 carbon atoms, n is an integer from 1 to 6, and R's of n in number are the same or different.

Furthermore, it is possible to use 1 to 40 parts by weight of α-olefin (c) in addition to reactants (a) and (b) for preparing the acid modified hydrocarbon resin (A).

A second aspect of the present invention relates to a vehicle for preparing lithographic printing ink containing the following components (I) to (III):

(I) petroleum resin-modified phenol resin which is prepared by reacting:
acid modified hydrocarbon resin (A): . . . 100 parts by weight and phenol resin (B) having alkyl substituent groups each having 4 to 25 carbon atoms: . . . 30–150 parts by weight, said acid modified hydrocarbon resin (A) being prepared by reacting:

(a) compounds mainly comprising five-membered cyclic compounds represented by the following general formula [1] or their Diels-Alder reaction products: . . . 100 parts by weight
and (b) unsaturated carboxylic acids or their anhydrides: . . . 1–20 parts by weight,
and said petroleum resin-modified phenol resin (I) having the properties of:
<1> weight average molecular weight of not less than: . . . 200,000
<2> melt viscosity ($V_m$) of not higher than: . . . 100 Pa·s
<3> K value ($V_m/V_s$) as a ratio of melt viscosity to solution viscosity ($V_s$) of not higher than: . . . 0.2,
(II) drying oil and/or semi-drying oil, and
(III) non-aromatic petroleum solvent.

Furthermore, it is possible to use 1 to 40 parts by weight of α-olefin (c) in addition to reactants (a) and (b) for preparing the acid modified hydrocarbon resin (A).

A third aspect of the present invention relates to a vehicle for lithographic printing ink, wherein said non-aromatic petroleum solvent (III) is a naphthenic solvent having a high boiling point.

A fourth aspect of the present invention relates to a method for preparing a petroleum resin-modified phenol resin as the binder resin for lithographic printing ink which is characterized in that the above acid modified hydrocarbon resin (A) prepared by reacting the compounds mainly comprising five-membered cyclic compounds of the foregoing general formula [1] or their Diels-Alder reaction products with unsaturated carboxylic acids or their anhydrides, is reacted with phenol resin (B) having alkyl substituent groups each having 4 to 25 carbon atoms, wherein portions of the phenol resin are fed one after another, thereby producing a reaction product of (A) with (B) having the properties of:
<1> weight average molecular weight of not less than: . . . 200,000
<2> melt viscosity ($V_m$) of not higher than: . . . 100 Pa·s
<3> K value ($V_m/V_s$) as the ratio of melt viscosity to solution viscosity of not higher than: . . . 0.2.

A fifth aspect of the present invention relates to a method for preparing a petroleum resin-modified phenol resin as the binder for lithographic printing ink which is characterized in that the above acid modified hydrocarbon resin (A) which is prepared by reacting the compounds mainly comprising five-membered cyclic compounds represented by the foregoing general formula [1] or their Diels-Alder reaction products, α-olefin and unsaturated carboxylic acids or their anhydrides, is reacted with phenol resin (B) having alkyl substituent groups each having 4 to 25 carbon atoms, wherein portions of the phenol resin are fed one after another, thereby producing a reaction product of (A) with (B) having the properties of:
<1> weight average molecular weight of not less than: . . . 200,000
<2> melt viscosity ($V_m$) of not higher than: . . . 100 Pa·s
<3> K value ($V_m/V_s$) as the ratio of melt viscosity to solution viscosity of not higher than: . . . 0.2.

DETAILED DESCRIPTION OF THE INVENTION

The present invention will be described in more detail.

In the vehicle for the lithographic printing ink according to the present invention, the petroleum resin-modified phenol resin (I) used as a binder resin is prepared by reacting an acid modified hydrocarbon resin (A) and a phenol resin (B) having alkyl substituent groups each having 4 to 25 carbon atoms.

The above acid modified hydrocarbon resin (A), hereinafter simply referred to as "acid modified resin (A)" is prepared by reacting 100 parts by weight of the foregoing compounds (a) which mainly comprising five-membered cyclic compounds represented by the foregoing general formula [1] or their Diels-Alder reaction products and 1–20 parts by weight of unsaturated carboxylic acids or their anhydrides (b), and in addition, preferably together with 1–40 parts by weight of α-olefin (c).

The above-mentioned five-membered cyclic compounds as represented by formula [1] are exemplified by cyclopentadiene and methylcyclopentadiene and the Diels-Alder reaction products are exemplified by dicyclopentadiene, codimer of cyclopentadiene and dicyclopentadiene, tricyclopentadiene and the mixtures of them.

In addition to the above five-membered cyclic compounds represented by the foregoing general formula [1] and/or their Diels-Alder reaction products, the components (a) in the acid modified resin (A) in the present invention are exemplified by the composition containing the above compounds as main components. That is, the components containing more than 50% by weight, preferably more than 80% by weight, of the above the five-membered cyclic compounds of the general formula [1] or their Diels-Alder reaction products can be employed. Accordingly, the usable components (a) are prepared, for example, by subjecting cyclopentadiene and methylcyclopentadiene contained in a $C_5$ fraction of the by-product oil of high temperature thermal cracking of naphtha to thermal dimerization to obtain dicyclopentadiene, cyclopentadiene/methylcyclopentadiene codimer, cyclopentadiene/isoprene codimer and cyclopentadiene/piperylene codimer, and then distilling the reaction product to remove the most part of $C_5$ components such as $C_5$ olefins and $C_5$ paraffins.

Furthermore, it is possible to use as components (a) the mixture of the above-mentioned five-membered cyclic compounds and/or their Diels-Alder reaction products and unsaturated components in a petroleum fraction, especially unsaturated aromatic components such as one member or a mixture of two or more of the group consisting of styrene, α-methylstyrene, vinyltoluene, indene and methylindene. Accordingly, the mixture of the by-product fraction in the naphtha cracking and the above-mentioned five-membered cyclic compounds and/or their Diels-Alder reaction products, can also be used as the components (a).

The components (b) for the acid modified resin (A) of the present invention are unsaturated carboxylic acids or their anhydrides. The number of carbon atoms in each of them is in the range of 3 to 32, preferably 3 to 15. These components (b) are exemplified by acrylic acid, methacrylic acid, maleic acid, maleic anhydride, tetrahydrophthalic acid and its anhydride, fumaric acid, citraconic acid, itaconic acid, and aliphatic acids of drying oils such as aliphatic acid of linseed oil. These carboxylic acids and their anhydrides may be used singly or as a mixture of them. Especially preferable ones as the components (b) are acrylic acid, methacrylic acid, maleic acid and maleic anhydride. The acid modified resin (A) can be prepared by using these unsaturated carboxylic acids or their anhydrides as the components (b).

In the preparation of the acid modified resin (A) according to the present invention, 1 to 200 parts by weight of other components (c) can be used in the reaction in addition to the above components (a) and (b), in order to improve the properties of resultant resin (A). These components (c) are exemplified by α-olefins and unsaturated aromatic hydrocarbon monomers each having carbon-carbon double bond (s) and benzene ring(s) in the molecule. The mixtures of them are also used.

The above unsaturated aromatic hydrocarbon monomers each having carbon-carbon double bond(s) and benzene ring(s) in the molecule are exemplified by styrene, α-methylstyrene, vinyltoluene, indene and methylindene having 8 to 20 carbon atoms and their mixtures. In industrial working, it is possible to use the $C_9$ aromatic by-product fraction having a boiling point in the range of 140 to 200° C. containing aromatic hydrocarbons as obtained in the thermal cracking of naphtha or else to produce ethylene and so forth, or the fraction containing 50% or more of unsaturated aromatic hydrocarbon monomers having carbon-carbon double bonds and benzene rings in molecules prepared by refining the above $C_9$ fraction, and the fraction containing 70% or more of vinyltoluene obtained by further refining.

As the other components (c) in the preparation of acid modified resin (A) of the present invention, α-olefins are especially preferable. The number of carbon atoms in each of the α-olefins is in the range of 4 to 40, preferably in the range of 6 to 20. Concerning the structures of these α-olefins, linear olefins and branched olefins which have no alkyl group on the β-position are preferable. The usable α-olefins are exemplified by 1-hexene, 4-methyl-1-pentene, 1-heptene, 1-octene, 1-nonene, 1-dodecene, 1-tetradecene, 1-hexadecene, 1-octadecene, 1-eicosene and the mixtures of them.

Furthermore, the product of oligomerization of ethylene and the α-olefin mixture which is obtained by the thermal cracking of paraffin wax can also be used as the α-olefin materials. The former one is exemplified by DIALENE (trademark, made by Mitsubishi Chemical Corp.) and the latter one is exemplified by CHEVRON α-OLEFIN (trademark, made by Chevron).

In the preparation of the acid modified resin (A), 1 to 20 parts by weight, preferably 3 to 15 parts by weight of component (b) of unsaturated carboxylic acid or its anhydride is used to 100 parts by weight of the above component (a). If the use quantity of the component (b) of unsaturated carboxylic acid or its anhydride is less than 1 part by weight, it is not desirable because the quantity of polar groups in the acid modified resin (A) is too small. On the other hand, when the quantity of component (b) is more than 20 parts by weight, the solubility of finally obtained binder resin to a non-aromatic solvent, is low. In addition, the emulsification is liable to occur by the dampening water for lithographic printing ink, so that the excess quantity of the component (b) is not desirable, either.

In connection with the other components (c), the use quantity of them is generally in the range of 1 to 200 parts by weight relative to 100 parts by weight of the components (a). In the case of the use of α-olefin which is especially preferable as a component (c), the use quantity is in the rage of 1 to 40 parts by weight, preferably in the range of 5 to 30 parts by weight. When the quantity of α-olefin as the component (c) is less than 1 part by weight, the solubility to the non-aromatic solvent for the finally obtained binder resin is low. On the other hand, when the quantity of α-olefin is more than 40 parts by weight, not only the yield of the acid modified resin (A) is low but also its softening point is also low, so that it is not desirable.

In the preparation of the acid modified resin (A), the above components (a) and (b) are simultaneously fed into a suitable reaction vessel and these two components are reacted together with or without catalyst.

When the other component (c) is copolymerized, the components (a), (b) and (c) are fed together into a suitable reaction vessel and these three components are reacted with or without catalyst. Meanwhile, it is also possible to prepare the acid modified resin (A) by previously reacting the component (a) with the component (c) with or without catalyst to produce a hydrocarbon resin and then the component (b) of unsaturated carboxylic acid or its anhydride is reacted with the obtained hydrocarbon resin.

When the reaction is carried out without catalyst, the reaction temperature is in the range of 200 to 300° C. and the reaction time length is in the range of 0.5 to 15 hours.

When a catalyst is employed in the reaction, about 0.1 to 10% by weight of Friedel-Crafts catalyst such as boron trifluoride, the complex of boron trifluoride with phenol, ether or acetic acid, or aluminum chloride is used. The temperature of reaction is in the range of –30 to 100° C. and the time length, in the range of 10 minutes to 20 hours.

The thus produced acid modified resin (A) may be esterified with alcohols, if desired. The esterification is effective in view of the adjustment of solubility and softening point of the acid modified resin (A) and the adjustment of molecular weight of finally obtained binder resin, i.e., petroleum resin-modified phenol resin.

The petroleum resin-modified phenol resin as the binder resin of the present invention can be prepared by reacting the thus prepared acid modified resin (A) with the phenol resin (B) with alkyl substituent groups each having 4 to 25 carbon atoms (hereinafter simply referred to as "phenol resin (B)") through a specific process.

In the reaction of the acid modified resin (A) with the phenol resin (B), it is important that portions of the phenol resin must be fed one after another. This is because of the fact that, in a batch-wise reaction system, for example, if the whole starting materials are fed together into a reaction vessel, the polymerization to high molecular weight is impossible due to the increase in melt viscosity. As the type of reaction, any of batch-wise system and continuous system can be employed. The wording "portions of the phenol resin are fed one after another" herein referred to means that the phenol resin (B) is divided into two or more portions and a portion of them is initially fed to the reaction system and the remainder portion(s) of phenol resin is (are) fed after the passage of a certain time in the batch-wise system, while in the continuous system, the remainder portion(s) is (are) fed to a downstream point or points that are apart from the initial feeding point. Furthermore, it is not necessary to use any catalyst in this reaction.

The above phenol resin (B) to be reacted with the acid modified resin (A), can be obtained by the condensation of phenol having alkyl substituent group(s) each having 4 to 25 carbon atoms, with formaldehyde (formalin). This condensation can be carried out through an ordinary reaction procedure. As the phenol having an alkyl substituent group with 4 to 25 carbon atoms, p-tert-butylphenol, sec-butylphenol, p-tert-octylphenol, nonylphenol and their mixtures are desirably used in the industrial production.

With 100 parts by weight of acid modified resin (A), the phenol resin (B) in the range of 30 to 150 parts by weight, preferably 35 to 100 parts by weight, is allowed to react. When the use quantity of the phenol resin (B) is smaller than 30 parts by weight, the polymerization to higher molecular weight is difficult and, as a result, the misting cannot be reduced. On the other hand, when the use quantity of the phenol resin (B) is larger than 150 parts by weight, the polymerization proceeds too excess and the viscosity of vehicle using the obtained resin is too high. So that, they are not desirable. The above addition quantity of phenol resin is the total quantity of the initial feeding and the subsequent gradual feeding. The phenol resin which is prepared by reacting formaldehyde with phenol having an alkyl substituent group with 4 to 25 carbon atoms in the presence of the acid modified resin (A), can be used as the phenol resin in the present invention.

In the reaction of the phenol resin (B) under heated condition, it is desirable that the reaction is carried out without solvent, that is, any solvent does not exist substantially in order to allow the high polymerization to proceed. The reaction in the presence of a solvent is not desirable because the degree of polymerization is limited to a certain level. Furthermore, if a drying oil or semi-drying oil exists, the degree of polymerization is also limited sometimes to a certain level. Accordingly, in the reaction between the acid modified resin (A) and the phenol resin (B) is preferably carried out without any drying oil or semi-drying oil. In other words, when the reaction between the acid modified resin (A) and the phenol resin (B) is carried out in the presence of a solvent, drying oil or semi-drying oil, even though the molecular weight of the reaction product is raised to a certain extent, the resultant polymerization degree is on the level in which the reduction of misting as the object of the present invention is not satisfactory.

In the reaction through well known batch wise system, 30 to 150 parts by weight, preferably 35 to 100 parts by weight, of the phenol resin (B) to 100 parts by weight of the acid modified resin (A) is fed into a reaction vessel and after the reaction, 0.1 to 10 parts by weight, preferably 0.1 to 5 parts by weight, of the phenol resin (B) relative to the 100 parts by weight of the acid modified resin (A), is further added to succeed the reaction so as to attain the high polymerization.

If the quantity of the phenol resin (B) added later is larger than 10 parts by weight, it is not desirable because gelation occurs. On the other hand, if the high polymerization is done without the latter additional feeding of the phenol resin (B), the difficulty is caused in the production process due to higher melt viscosity.

The temperature of batch wise reaction in any stage is in the range of 100 to 350° C., preferably in the range of 150 to 300° C. In the case that the reaction is carried out in two stages, the time length of the reaction in the initial stage is 0.5 to 15 hours and that in the latter additional stage is 10 minutes to 5 hours. It is of course possible to carry out the reaction through 3 or more stages.

The continuous production is carried out with a conventionally known multi-stage flow type reaction system. Any reaction apparatus in which a plurality of reaction zones are connected in series can be used. In general, a reactor in which reaction vessels are installed side by side in series is conveniently used.

The reaction is carried out by continuously feeding 100 parts by weight of acid modified resin (A) and 30 to 150 parts by weight, preferably 35 to 100 parts by weight, of phenol resin (B) to respective inlets of a reactor. The reaction temperature is in the range of 100 to 350° C., preferably 150 to 300° C. likewise in the batch wise reaction. The value of LHSV (liquid hourly space velocity) is preferably in the range of 0.01 to 100 $hr^{-1}$.

In the continuous reaction, the phenol resin (B) is divided and they are fed to different points of the reactor, at which the reaction times are different. For example, in a reactor having multistage reaction vessels, a part of the phenol resin (B) is additionally fed to a second or latter reaction vessel. The quantity of additional feed of the phenol resin (B) is, likewise the foregoing batch wise reaction, 0.1 to 10 parts by weight, preferably 0.1 to 5 parts by weight, relative to 100 parts by weight of the acid modified resin (A). If the ratio of feeding does not meet the above range, it is not desirable because difficulty occurs likewise in the foregoing batch wise reaction. In the case of multiple reaction vessels of three or more, the additional phenol resin can be added into any one of a second vessel or succeeding vessels, or it is also possible to feed the additional phenol resin into a plurality of vessels of the second vessel and succeeding ones.

The petroleum resin-modified phenol resin for lithographic printing ink according to the present invention is characterized in the properties of:

<1> 200,000 or more and preferably not more than 1,000,000 in weight average molecular weight;

<2> not higher than 100 Pa·s, preferably not lower than 1 Pa·s in melt viscosity ($V_m$); and <3> not higher than 0.2, preferably not lower than 0.01 in K value ($V_m/V_s$) as a ratio of melt viscosity to solution viscosity ($V_s$).

The methods for measuring the weight average molecular weight, melt viscosity and solution viscosity are specified in the description of examples.

In the petroleum resin-modified phenol resins having weight average molecular weights above 200,000 as disclosed in the foregoing European Patent No. 697 446, the measurement of the viscosity values was impossible because the melt viscosities of them were extremely high. However, in spite of the high molecular weight above 200,000, the melt viscosity ($V_m$) of the phenol resin used in the present invention is as low as 100 Pa·s or below. Even though the reason for the cause of difference in the melt viscosities is not apparent, it is supposed that the structures of resins are different from each other due to the difference in the procedure of production method. That is, when the reaction is done by feeding starting materials together as a whole as disclosed in the above patent gazette, the melt viscosity becomes high for its molecular weight because of the high degree formation of three dimensional cross linkages. In the present invention, however, it is considered that polymer having relatively large proportion of linear structure is produced, so that the resin of low melt viscosity for its high molecular weight can be produced.

This can be supposed also from the fact that, in the resin of the present invention, the K value ($V_m/V_s$) as the ratio of melt viscosity to solution viscosity is not higher than 0.2. In other words, the K value in the resin that is disclosed in the above patent gazette is higher than 0.2, so that when resins having a certain value in solution viscosity, the resin of the present invention is lower in melt viscosity as compared with the resin disclosed in the foregoing patent gazette. Both the melt viscosity and the solution viscosity correlate with the molecular weight, and if the K value ($V_m/V_s$) as the ratio of melt viscosity to solution viscosity of one resin is low, it supports the presumption that the structure of the relevant resin is different from those of resins in the prior art.

In the present invention, it is suitable that the petroleum resin-modified phenol resin in the present invention has a softening point of 100° C. or above, preferably 130° C. or above. If a printing ink is prepared using a resin having a softening point of lower than 100° C., much misting is caused, drying property is impaired and the blocking is liable to occur.

The acid value of the above petroleum resin-modified phenol resin is in the range of 5–50 mg-KOH/g and preferably 5–25 mg-KOH/g. If the acid value is lower than 5 mg-KOH/g, it is not possible to prepare a vehicle which has good affinity with pigments and the fluidity of vehicle is very low. On the other hand, if the acid value exceeds 50 mg-KOH/g, the solubility to non-aromatic solvents is low and, when printing ink is prepared using such a vehicle, emulsification is liable to occur with the dampening water.

In the preparation of lithographic printing ink, the foregoing petroleum resin-modified phenol resin of the present invention can be used in the well known method. For example, a high boiling hydrocarbon solvent and drying oil or semi-drying oil or their mixture are added to the petroleum resin-modified phenol resin of the present invention and they are stirred and dissolved together at an ordinary temperature or under a heated condition to obtain a varnish, then optional pigments are added and it is kneaded using a rolling mill to obtain a printing ink composition. Otherwise, a gelling agent is reacted by adding it to the vehicle to prepare gel-vehicle and pigments are then added to this gel-vehicle, which is then subjected to kneading to obtain a printing ink composition. As the high boiling hydrocarbon solvents, those having boiling points in the range of 200 to 350° C., preferably 250 to 330° C. and containing 50% by weight or less, preferably less than 30% by weight, of aromatic components, can be used.

The vehicle for the lithographic printing ink using the above-described petroleum resin-modified phenol resin can be prepared by dissolving 100 parts by weight of the petroleum resin-modified phenol resin in 50 to 200 parts by weight, preferably 70 to 150 parts by weight, of non-aromatic petroleum solvent and 5 to 100 parts by weight, preferably 10 to 80 parts by weight, of drying oil and/or semi-drying oil, at an ordinary temperature or under heated condition.

The lithographic printing ink can be prepared by adding pigments directly to the above vehicle, or a gelling agent is added and reacted with the vehicle and pigments are added to the obtained gel-vehicle and kneaded to prepare lithographic printing ink.

It is desirable that the high boiling naphthenic solvent is used as the above non-aromatic petroleum resin. The solvent containing 60% or more, preferably 70% or more, of naphthenic hydrocarbons and having a boiling point of 200° C. or above is desirable. As such a solvent, commercially available AF SOLVENT (trademark, made by Nippon Oil Company, Limited) and MAGIE SOLVENT (trademark, made by Magie Bros. Oil Co.) are used in the present invention as the non-aromatic solvents.

The above-described usable drying oils and semi-drying oils are exemplified by linseed oil, tung oil, soybean oil, and boiled oil and stand oils of them, and the mixtures of these oils.

In order to dissolve by heating the petroleum resin-modified phenol resin, non-aromatic petroleum solvent, and drying oil and/or semi-drying oil, the above-mentioned ordinarily known methods can be employed.

The present invention will be described in more detail with reference to several examples.

EXAMPLE 1

A 2 liter autoclave was fed with 650 g of dicyclopentadiene (DCPD) of 97% purity, 538 g of $C_9$ fraction obtained by thermal cracking of naphtha (containing 350 g of unsaturated components of DCPD, vinyltoluene, α-methylstyrene and indene), 100 g of α-olefin mixture having 16 to 18 carbon atoms (trademark: DIALENE 168, made by Mitsubishi Chemical Corp.) and 70 g of methacrylic acid, and under nitrogen atmosphere, they were reacted for 3 hours at 270° C. The reaction product was then subjected to reduced pressure distillation at 210° C./2 mm Hg to obtain 1,152 g of acid modified hydrocarbon resin. The softening point of this resin was 112° C. and acid value, 13 mg-KOH/g.

Then, 100 g of this acid modified hydrocarbon resin was reacted at 220° C. for 2 hours with 62 g of resole type phenol resin that was obtained by the condensation of nonylphenol and formalin. After that, 3 g of resole type phenol resin was further added and allowed to reacted for further 30 minutes to obtain petroleum resin-modified phenol resin.

COMPARATIVE EXAMPLE 1

An acid modified hydrocarbon resin was prepared in the like manner as in Example 1. Then, 100 g of this acid modified hydrocarbon resin was reacted at 220° C. for 2 hours with 65 g of resole type phenol resin that was obtained by the condensation of nonyl phenol and formalin.

EXAMPLE 2

A continuous conversion apparatus which was equipped with two reaction vessels arranged in series and each reaction vessel was equipped with a stirrer, was used. 100 parts by weight of the acid modified hydrocarbon resin obtained in Example 1 and 65 parts by weight of the resole type phenol resin obtained by condensation of nonyl phenol and formalin were continuously fed into the first reaction vessel of the above apparatus. The continuous reaction was carried out under the conditions that the temperature of 220° C. and retention time of 1 hour in the first reaction vessel and the temperature of 220° C. and retention time of 2 hours in the second reaction vessel. Furthermore, 0.5 parts by weight of resole type phenol resin obtained by condensation of nonyl phenol and formalin relative to 100 parts by weight of acid modified hydrocarbon resin, was continuously fed to the second reaction vessel to obtain petroleum resin-modified phenol resin.

EXAMPLE 3

A 2 liter autoclave was fed with 1000 g of dicyclopentadiene (DCPD) of 97% purity and 250 g of α-olefin mixture having 6 to 10 carbon atoms (trademark: DIALENE 610, made by Mitsubishi Chemical Corp.). Under nitrogen atmosphere, they were reacted for 2.5 hours at 280° C. The reaction product was then subjected to reduced pressure distillation at 210° C./2 mm Hg to obtain 1,220 g of hydrocarbon resin. 100 g of this hydrocarbon resin was heated at 200° C. and with adding 3 g of maleic anhydride, they were reacted for 4 hours to obtain an acid modified hydrocarbon resin. The softening point of this resin was 118° C. and acid value, 14 mg-KOH/g.

Then, 100 g of this acid modified hydrocarbon resin was reacted at 220° C. for 2 hours with 40 g of resole type phenol resin that was obtained by the condensation of p-tert-butyl phenol and formalin. After that, 5 g of resole type phenol resin was further added and allowed to reacted for further 1 hour to obtain a petroleum resin-modified phenol resin.

In the following Table 1, properties and solubilities to naphthenic solvent of the petroleum resin-modified phenol resins obtained in the foregoing Examples and Comparative Example, are shown.

The measurement of the respective properties were carried out as follows:

|     |     |
| --- | --- |
| (1) | Softening point |
|     | According to JIS K 2531 (Ring and ball method) |
| (2) | Oxidation |
|     | According to JIS K 2501 |
| (3) | Weight average molecular weight |

Measured by GPC method and represented by weight average molecular weights as converted to polystyrene. The specification of GPC apparatus was as follows:

Apparatus: Trademark: 150C, made by Waters

Column: 30 cm, 2 columns; trademark: Shodex KF-807L, made by Showa Denko K.K.

Calibration Curve: Polystyrene was used (4) Solubility:

A petroleum resin-modified phenol resin and a solvent in the weight ratio of 50/50 were mixed together to prepare a vehicle. The solvent was further added gradually to dilute the vehicle. The ratio of dilution when white turbidity was observed, is calculated. If the value is large, the solubility is good.

As solvents, naphthenic solvents of AF-7 SOLVENT and AF-5 SOLVENT (both trademarks, made by Nippon Oil Co., Ltd.) were used.

(5) Melt Viscosity

Used apparatus and measuring conditions were as follows:

Apparatus: Trademark: MR-300 SOLIQUID METER, made by Rheology K.K.

Corn Plate: Plate dia.: 40 mm, corn dia: 20 mm, angle: 2°

Shear Rate: 6.16 sec$^{-1}$ (rotational speed of corn: 20 rpm)

Temperature: 220° C.

(6) Solution Viscosity

The viscosity of mixed solution of AF-7 SOLVENT and a petroleum resin-modified phenol resin in the weight ratio of 50/50. The composition of AF-7 SOLVENT will be referred to later.

TABLE 1

Preparation of Modified Resins

|  | Example 1 | Example 2 | Example 3 | Com. Ex. 1 |
| --- | --- | --- | --- | --- |
| Initial Feeds (Ratio in wt. parts) |  |  |  |  |
| Acid Modified Resin / Phenol Resin | 100/62 | 100/65 | 100/40 | 100/65 |
| Phenol Resin Fed Later (wt. parts) | 3 | 0.5 | 5 | 0 |
| Type of Conversion | Batch | Continuous | Batch | Batch |
| Properties of Converted Resin |  |  |  |  |
| Softening Pt. (° C.) | 167.0 | 169.0 | 168.0 | 168.0 |
| Acid Value (mg-KOH/g) | 15 | 13 | 13 | 14 |
| Wt. Av. Mol. Wt. (X10$^4$) | 24.2 | 27.1 | 22.0 | 12.2 |
| Melt Visc. (220° C., Pa · s) | 32.7 | 57.9 | 42.0 | 52.5 |
| Soln. Visc. (25° C., Pa · s) | 280 | 300 | 226 | 222 |
| K Value ($V_m/V_s$) | 0.117 | 0.193 | 0.186 | 0.236 |
| Solubility: |  |  |  |  |
| AF-7 SOLVENT | >19 | >19 | >19 | >19 |
| AF-5 SOLVENT | >19 | >19 | >19 | >19 |

Notes:
Com. Ex.: Comparative Example
Wt. Av. Mol. Wt.: Weight average molecular weight
>19: 19 or more <Tests of Inks>

The above petroleum resin-modified phenol resin in Examples and Comparative Example, and a commercially available rosin-modified phenol resin (RP) were used as binders and naphthenic solvents and an aromatic solvent were used as vehicle solvents to prepare the vehicles having the compositions as shown in Table 2 and Table 3. Then, several inks were prepared and the properties of the respective inks and the properties of printed matters made by using these printing inks were evaluated. In Table 2, the evaluation results of black inks are shown and in Table 3, those of red inks are shown.

The commercially available resin, properties of solvents and measurement methods were as follows:

[Rosin-Modified Phenol Resin (RP)]

Softening Point: . . . 170° C.

Weight Average Molecular Weight: . . . 24,000

Acid Value: . . . 19 mg-KOH/g

Trademark: TAMANOL 354 (made by Arakawa Chemical Industries, Ltd.)

[Solvents]

(1) AF-7 SOLVENT

Boiling Point: . . . 260–281° C.

Aromatic Content: . . . 0.2 vol. %

Naphthene Content: . . . 77.3 vol. %

Paraffin Content: . . . 22.5 vol. %

(2) No. 7 SOLVENT

Boiling Point: . . . 258–287° C.

Aromatic Content: . . . 20 vol. %

Naphthene Content: . . . 0.5 vol. %

Paraffin Content: . . . 79.5 vol. %

[Measurement Method]

(1) Tack: A tack tester was used (60 second value).
(2) SR: A parallel plate plastometer was used (60 second value)
(3) Color Density: A color density meter was used.
(4) Gloss: A gloss meter was used (reflection angle 60°)
(5) Misting: The misting of ink was observed with naked eyes by continuously kneading the ink with a three roll ink mill. The rotational speed of the three roll mill was 600 rpm. By the way, the test of misting are usually done at a roll rotational speed of 400 rpm, however, in compliance with the high speed printing in recent years, in the tests on both the black inks and red inks, the rotational speed was raised to 600 rpm.

The test results were indicated with the four-graded symbols of ⊚, ○, Δ and x, in which the symbol ⊚ indicates the occurrence of misting was less and, gradually increasing the misting in the symbols of ○ and Δ, the last symbol x indicates that much misting was observed.

TABLE 2

Evaluation of Black Inks

|  | Example 1 | Example 2 | Example 3 | Com. Ex. 1 | Rosin Pheonol |
|---|---|---|---|---|---|
| Vehicle Composition (parts by weight) | | | | | |
| Resin | 50 | 50 | 50 | 50 | 50 |
| No. 7 Linseed Oil | 10 | 10 | 10 | 10 | 10 |
| AF-7 SOLVENT | 48.5 | 51.0 | 49.0 | 48.0 | — |
| No. 7 SOLVENT | — | — | — | — | 50 |
| Vehicle Viscosity (Pa·s) | | | | | |
| Non-Gel Vehicle Visc. | 65.0 | 67.0 | 68.0 | 57.0 | 62.5 |
| Gel Vehicle Visc. | 286.0 | 320.0 | 380.0 | 148.0 | 73.0 |
| Ink Composition (parts by weight) | | | | | |
| Resin | 31.3 | 30.9 | 32.1 | 31.7 | 30.5 |
| No. 7 Linseed Oil | 6.3 | 6.2 | 6.4 | 6.3 | 6.1 |
| AF-7 SOLVENT | 45.4 | 45.9 | 44.1 | 44.9 | — |
| No. 7 SOLVENT | — | — | — | — | 46.6 |
| Pigment (carbon black) | 17.0 | 17.1 | 17.4 | 17.1 | 16.8 |
| Properties of Ink | | | | | |
| Tack | 8.7 | 8.4 | 9.3 | 8.3 | 8.5 |
| SR: Before Emulsification | 36.4 | 35.8 | 29.0 | 18.4 | 41.4 |
| SR: After Emulsification | 38.0 | 36.8 | 29.1 | 19.3 | 36.6 |
| Evaluation of Printed Material | | | | | |
| Color Density | 2.16 | 2.12 | 1.93 | 2.19 | 2.06 |
| Gloss | 80 | 77 | 81 | 85 | 75 |
| Drying Property (150° C., sec.) | 30 | 30 | 30 | 30 | 30 |
| Misting (600 rpm) | ⊚ | ⊚ | ⊚ | Δ ~ ○ | Δ ~ x |

Note:
Rosin Phenol: Rosin modified phenol resin

TABLE 3

Evaluation of Red Inks

|  | Example 1 | Example 2 | Example 3 | Com. Ex. 1 | Rosin Pheonol |
|---|---|---|---|---|---|
| Vehicle Composition (parts by weight) | | | | | |
| Resin | 50 | 50 | 50 | 50 | 50 |
| No. 7 Linseed Oil | 20 | 20 | 20 | 20 | 20 |

TABLE 3-continued

Evaluation of Red Inks

|  | Example 1 | Example 2 | Example 3 | Com. Ex. 1 | Rosin Pheonol |
|---|---|---|---|---|---|
| AF-7 SOLVENT | 42.0 | 42.0 | 42.0 | 37.3 | — |
| No. 7 SOLVENT | — | — | — | — | 41.5 |
| Vehicle Viscosity (Pa·s) | | | | | |
| Non-Gel Vehicle Visc. | 55.0 | 70.0 | 70.0 | 64.0 | 65.0 |
| Gel Vehicle Visc. | 217.0 | 305.0 | 310.0 | 130.0 | 69.0 |
| Ink Composition (parts by weight) | | | | | |
| Resin | 30.2 | 30.2 | 30.8 | 31.3 | 29.9 |
| No. 7 Linseed Oil | 12.1 | 12.1 | 12.3 | 12.4 | 11.9 |
| AF-7 SOLVENT | 38.99 | 38.9 | 38.8 | 37.9 | — |
| No. 7 SOLVENT | — | — | — | — | 46.6 |
| Pigment (Carmine 6B) | 18.9 | 18.9 | 18.1 | 18.7 | 17.6 |
| Properties of Ink | | | | | |
| Tack | 9.2 | 8.4 | 9.2 | 7.7 | 7.0 |
| SR: Before Emulsification | 36.2 | 35.0 | 36.2 | 20.8 | 46.2 |
| SR: After Emulsification | 34.4 | 32.4 | 35.1 | 19.1 | 39.8 |
| Evaluation of Printed Material | | | | | |
| Color Density | 1.83 | 1.85 | 1.83 | 1.76 | 1.75 |
| Gloss | 71 | 72 | 71 | 51 | 44 |
| Drying Property (150° C., sec.) | 30 | 30 | 30 | 30 | 30 |
| Misting (600 rpm) | ⊚ | ⊚ | ⊚ | Δ ~ ○ | Δ ~ x |

The melt viscosity of the petroleum resin-modified phenol resin prepared by the method of the present invention is low in spite of its large molecular weight, so that the workability in the polymerization process is improved.

Furthermore, it is possible to replace the conventionally used aromatic solvents as the lithographic printing ink vehicle with non-aromatic solvents by using the above resin as the binder resin for lithographic ink. In addition, the ink composition prepared by dispersing a pigment into a vehicle composed of a certain quantity of the petroleum resin-modified phenol resin, non-aromatic solvent and drying oil and/or semi-drying oil, scarcely produces the mist.

What is claimed is:

1. A binder resin of petroleum resin-modified phenol resin (I) for a lithographic printing ink vehicle, said binder resin comprising a component material prepared by reacting:
    100 parts by weight of an acid modified hydrocarbon resin (A) with 30 to 150 parts by weight of a phenol resin (B) having alkyl substituent groups, each group having 4 to 25 carbon atoms, wherein portions of said phenol resin (B) are fed one after another for reaction with said acid modified hydrocarbon resin (A), said acid modified hydrocarbon resin (A) being prepared by reacting:
    (a) 100 parts by weight of compounds comprising five-membered cyclic compounds represented by the formula [1] or their Diels-Alder reaction products:

[1]

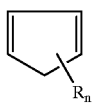

wherein R denotes a hydrogen atom or an alkyl group having 1 to 3 carbon atoms, n is an integer from 1 to 6, and each R may be the same or different, and (b) 1 to 20 parts by weight of unsaturated carboxylic acids or their anhydrides, said petroleum resin-modified phenol resin (I) having the properties of:
(i) a weight average molecular weight of not less than 200,000,
(ii) a melt viscosity ($V_m$) of not higher than 100 Pa·s, and
(iii) a K value ($V_m/V_s$) as a ratio of melt viscosity to solution viscosity ($V_s$) of not higher than 0.2.

2. The binder resin of petroleum resin-modified phenol resin (I) as claimed in claim 1, wherein 1 to 40 parts by weight of α-olefin (c) is reacted with said components (a) and (b) for preparing said acid modified hydrocarbon resin (A).

3. A binder resin as claimed in claim 1 wherein said five-membered cyclic compounds comprise cyclopentadiene or methylcyclopentadiene.

4. A lithographic printing ink comprising the binder resin of claim 1 and pigment.

5. A vehicle for preparing lithographic printing ink, said vehicle comprising components (I) to (III):
(I) a petroleum resin-modified phenol resin as a binder resin for lithographic printing ink, said petroleum resin-modified phenol resin being prepared by reacting:
100 parts by weight of an acid modified hydrocarbon resin (A) with 30 to 150 parts by weight of a phenol resin (B) having alkyl substituent groups, each group having 4 to 25 carbon atoms, wherein portions of said phenol resin (B) are fed one after another for reaction with said acid modified hydrocarbon resin (A), said acid modified hydrocarbon resin (A) being prepared by reacting:
(a) 100 parts by weight of compounds comprising five-membered cyclic compounds represented by the formula [1] or their Diels-Alder reaction products:

[1]

wherein R denotes a hydrogen atom or an alkyl group having 1 to 3 carbon atoms, n is an integer from 1 to 6 and each n may be the same or different, and
(b) 1 to 20 parts by weight unsaturated carboxylic acids or their anhydrides, said petroleum resin-modified phenol resin (I) having the properties of:
(i) a weight average molecular weight of not less than 200,000,
(ii) a melt viscosity ($V_m$) of not higher than 100 Pa·s, and
(iii) a K value ($V_m/V_s$) as a ratio of melt viscosity to solution viscosity ($V_s$) of not higher than 0.2,
(II) a drying oil and/or semi-drying oil, and
(III) a non-aromatic petroleum solvent.

6. The vehicle for preparing lithographic printing ink as claimed in claim 5, wherein 1 to 40 parts by weight of α-olefin (c) is reacted with said components (a) and (b) in the preparation of said acid modified hydrocarbon resin (A).

7. The vehicle for preparing lithographic printing ink as claimed in claim 6, wherein said non-aromatic petroleum solvent (III) is a high boiling naphthenic solvent.

8. The vehicle for preparing lithographic printing ink as claimed in claim 5, wherein said non-aromatic petroleum solvent (III) is a high boiling naphthenic solvent.

9. A vehicle as claimed in claim 5 wherein said five-membered cyclic compounds comprise cyclopentadiene or methylcyclopentadiene.

10. A lithographic printing ink comprising the vehicle of claim 5 and pigment.

11. A method for preparing a petroleum resin-modified phenol resin as a binder resin for lithographic printing ink, comprising:
preparing an acid modified hydrocarbon resin (A) by reacting the components (a) comprising five-membered cyclic compounds represented by the formula [1] or their Diels-Alder reaction products:

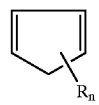

[1]

wherein R denotes a hydrogen atom or an alkyl group having 1 to 3 carbon atoms, n is an integer from 1 to 6 and each R may be the same or different,
with the components (b) comprising unsaturated carboxylic acids or their anhydrides, and
reacting said acid modified hydrocarbon resin (A) with phenol resin (B) having alkyl substituent groups each having 4 to 25 carbon atoms, wherein portions of said phenol resin are fed one after another,
thereby producing petroleum resin-modified phenol resin having the properties of:
(i) a weight average molecular weight of not less than 200,000,
(ii) a melt viscosity ($V_m$) of not higher than 100 Pa·s, and
(iii) a K value ($V_m/V_s$) as the ratio of melt viscosity to solution viscosity of not higher than 0.2.

12. A method for preparing a petroleum resin-modified phenol resin as the binder resin as claimed in claim 11, wherein α-olefin (c) is reacted with said components (a) and (b) in the preparation of said acid modified hydrocarbon resin (A).

13. A method as claimed in claim 11 wherein said acid modified hydrocarbon resin (A) and said phenol resin (B) are reacted in a batch-wise system.

14. A method as claimed in claim 11 wherein said acid modified hydrocarbon resin (A) and said phenol resin (B) are reacted in a continuous system.

15. A method as claimed in claim 11 wherein said five-membered cyclic compounds comprise cyclopentadiene or methylcyclopentadiene.

* * * * *